US008590783B2

(12) United States Patent
Deane et al.

(10) Patent No.: US 8,590,783 B2
(45) **Date of Patent: *Nov. 26, 2013**

(54) SECURITY DEVICE READER AND METHOD OF VALIDATION

(75) Inventors: Dorian A. Deane, Reston, VA (US); Mark D. Carney, Sterling, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1758 days.

This patent is subject to a terminal disclaimer.

(21) Appl. No.: 11/694,037

(22) Filed: Mar. 30, 2007

(65) Prior Publication Data

US 2009/0321517 A1 Dec. 31, 2009

(51) Int. Cl.
*G06K 17/00* (2006.01)

(52) U.S. Cl.
USPC ........... 235/380; 235/375; 235/379; 235/487; 235/492

(58) Field of Classification Search
USPC ................. 235/375, 379, 380, 382, 487, 492; 705/5, 35–45
See application file for complete search history.

(56) References Cited

U.S. PATENT DOCUMENTS

| | | | | |
|---|---|---|---|---|
| 5,502,765 | A * | 3/1996 | Ishiguro et al. | 705/67 |
| 7,733,231 | B2 * | 6/2010 | Carney et al. | 340/573.1 |
| 2004/0193613 | A1 * | 9/2004 | Armand | 707/100 |
| 2005/0133594 | A1 * | 6/2005 | Brookner | 235/383 |
| 2005/0211767 | A1 * | 9/2005 | Sawachi | 235/380 |
| 2005/0247777 | A1 * | 11/2005 | Pitroda | 235/380 |
| 2006/0274945 | A1 * | 12/2006 | Chu et al. | 382/190 |
| 2007/0251997 | A1 * | 11/2007 | Brown et al. | 235/380 |

* cited by examiner

*Primary Examiner* — Michael G Lee
*Assistant Examiner* — Matthew Mikels

(57) ABSTRACT

A method performed by a device may include exchanging encryption information with a security card, generating validation information based on the exchanged encryption information with the security card and transmitting the validation information to the security card for display.

20 Claims, 13 Drawing Sheets

530

| DATA (610) | TRUST LEVEL (620) | AUTHORITY (630) | SIGNATURE (640) | RESTRICTION (650) | DISPLAY (660) |
|---|---|---|---|---|---|
| D1 | T1 | A1 | S1 | | 0 |
| D2 | T1 | A1 | S2 | | 1 |
| D3 | T3 | A7 | S11 | R1 | 0 |
| D4 | T4 | A2, A3 | S3, S4 | R2, R3 | 0 |

FIG. 6

SECURITY DEVICE READER AND METHOD OF VALIDATION

BACKGROUND

At the present time, the need for positive identification of authorized personnel has become increasingly important. Existing methods of identifying people include the use of security badges that contain a photo of the authorized owner of the badge. Security badges are easily forged or altered by an attacker, for example, by replacing the photo of the original owner of the badge with a photo of the attacker. Therefore, a need exists for a more secure method of identifying authorized personnel.

BRIEF DESCRIPTION OF THE DRAWINGS

FIG. 6 illustrates a data structure stored in a security device reader according to an exemplary implementation;

DETAILED DESCRIPTION OF PREFERRED EMBODIMENTS

The following detailed description of the embodiments refers to the accompanying drawings. The same reference numbers in different drawings identify the same or similar elements. Also, the following detailed description does not limit the embodiments. Instead, the scope of the embodiments is defined by the appended claims and their equivalents.

Figure 1:
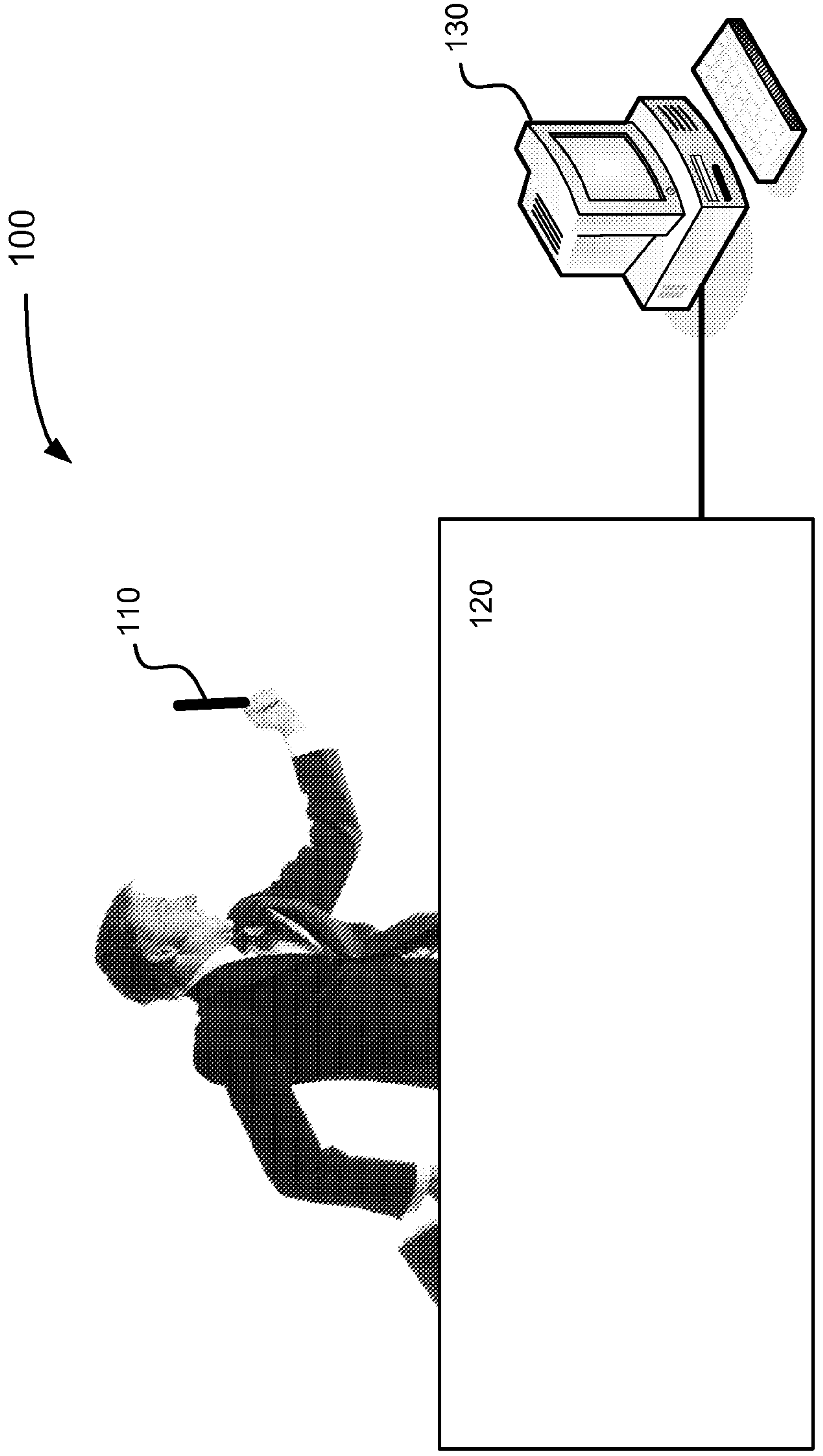
FIG. 1 illustrates a security system according to an exemplary embodiment.

FIG. 1 is a diagram of an exemplary security system 100. Security system 100 may include a security device 110, a security device reader 120 and optionally a computer 130 connected to security device reader 120. Security device 110 may be a portable or handheld device to be used, for example, as a security card or as an identification badge to enter or exit a secure building, etc. Security device 110 may include a display portion and a printed portion that may contain text and images identifying a user. Security device 110 may include hardware and/or software for storing encrypted information and images relating to a user. Security device 110 may also exchange encryption information with security device reader 120 as described below.

Security device reader 120 may include a device capable of exchanging encryption information with security device 110. After exchanging encryption information with security device 110, security device reader 120 may read data from and/or validate/invalidate security device 110. For example, security device reader 120 may generate and display validation/invalidation information based on exchanged information with security device 110. Security device reader 120 may also transmit the validation/invalidation information to security device 110 for display. Security device reader 120 may transmit information received from security device 110 to computer 130 and may open/close a security gate, generate an alarm, etc., in response to the validation/invalidation of security device 110, for example.

Computer 130 may include any type of computation device which may contain input and output devices, such as, for example, a keyboard and a monitor. Computer 130 may be connected to security device reader 120 in order to display information generated by security device reader 120 and/or received from security device 110, for example. For example, a security guard at the entrance of a restricted building may view information displayed on computer 130, in order to confirm the validity/identity of a user of security device 110. Optionally, security device reader 120 and computer 130 may combine their functions into a single device.

Figure 2:
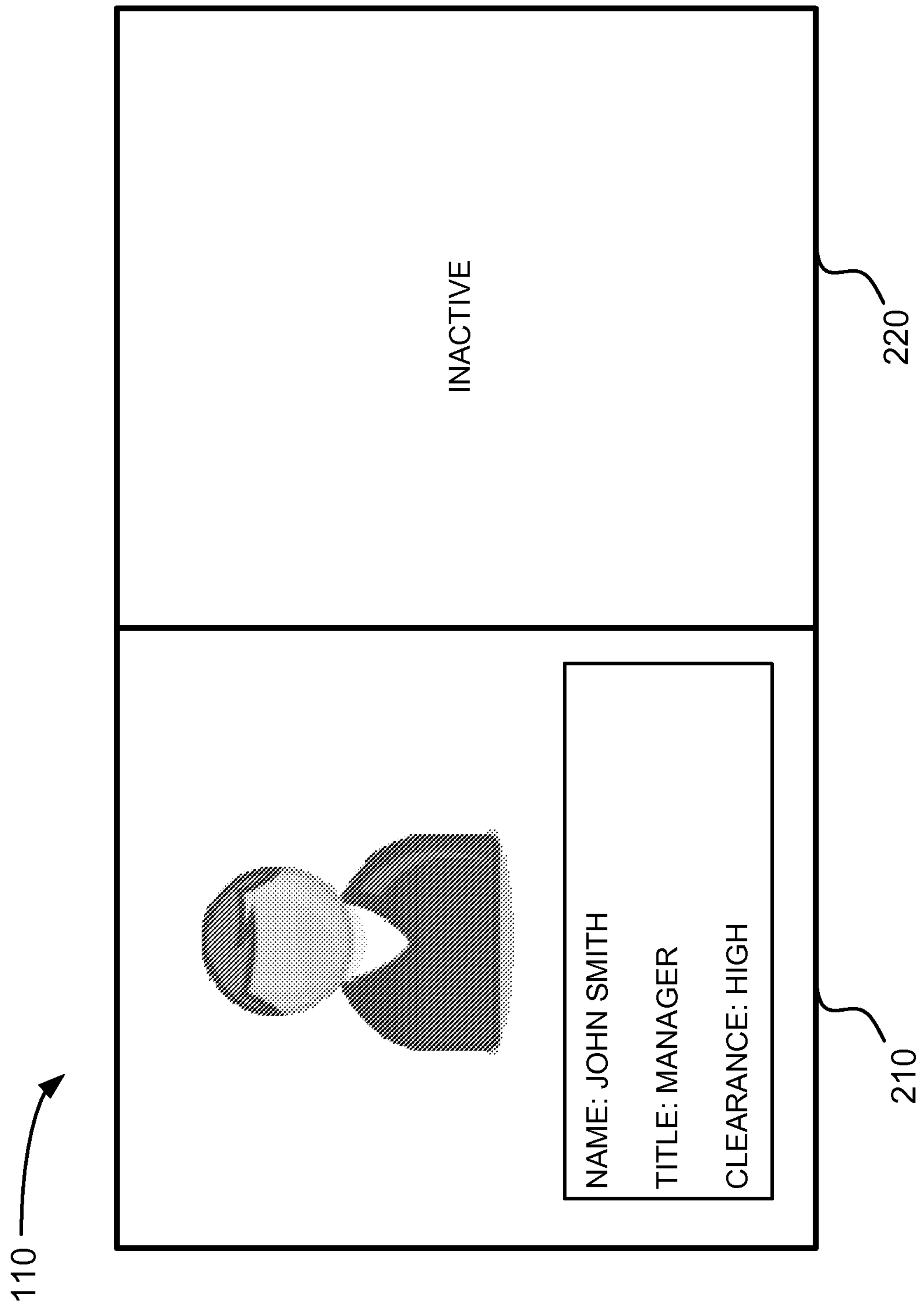
FIG. 2 illustrates a security device according to an exemplary embodiment.

FIG. 2 illustrates an exemplary security device 110. Security device 110 may include a printed portion 210 and a display portion 220. Security device 110 may be laminated, or use similar protective measures, in order to protect both the printed portion 210 and display portion 220 from, for example, the effects of light or other environmental factors. Security device 110 may be a portable or a handheld device that may be used, for example, as an identification badge to enter or exit a secure building, etc. In one embodiment, security device 110 may be approximately the size of a credit card, with dimensions such as, for example, 2 inches by 3½ inches, with a thickness of, for example, ¼ inch. In other embodiments for example, the size of security device 110 may be larger, such as 3 inches by 6 inches, with a thickness of ½ inch. The physical dimensions of security device 110 may be different than the exemplary dimensions described here (e.g., a thickness of device 110 may less than ¼ of an inch). The physical form of security device 110 is not limited to the examples described herein, as security device 110 may be embodied in various physical forms or in various devices such as, for example, universal serial bus (USB) fobs, smart cards, or other devices or forms of media. Security device 110 may, for example, be configured as a security device reader 120, and may also be used as a passport, a driver's license, or for disaster response identification purposes.

Printed portion 210 may include a printed photograph of a person and printed information relating to the person's identification, occupation, security level etc. For example, printed portion 210 may include text information such as "NAME: John Smith," "TITLE: Manager," "CLEARANCE: High" and a picture of John Smith. Additionally, printed portion 210 may include other markings, borders, holograms, etc., that may reduce the likelihood of producing forged or counterfeit security devices.

Display portion 220 may include a display device that may display information. Display portion 220 may include, for example, an electronic paper surface (e.g., e-paper or electronic ink), organic light emitting diodes (OLEDs), thin film transistors (TFTs), polymer LEDs, or any type of liquid crystal display (LCD). Display portion 220 may display information (text and/or images) based on data received from security device reader 120. In this example, display portion 220 may display default information "Inactive." As described below, display portion 220 may change the information displayed based on data exchanges with security device reader 120, to, for example, provide indications of valid or invalid identification events.

Figure 3:
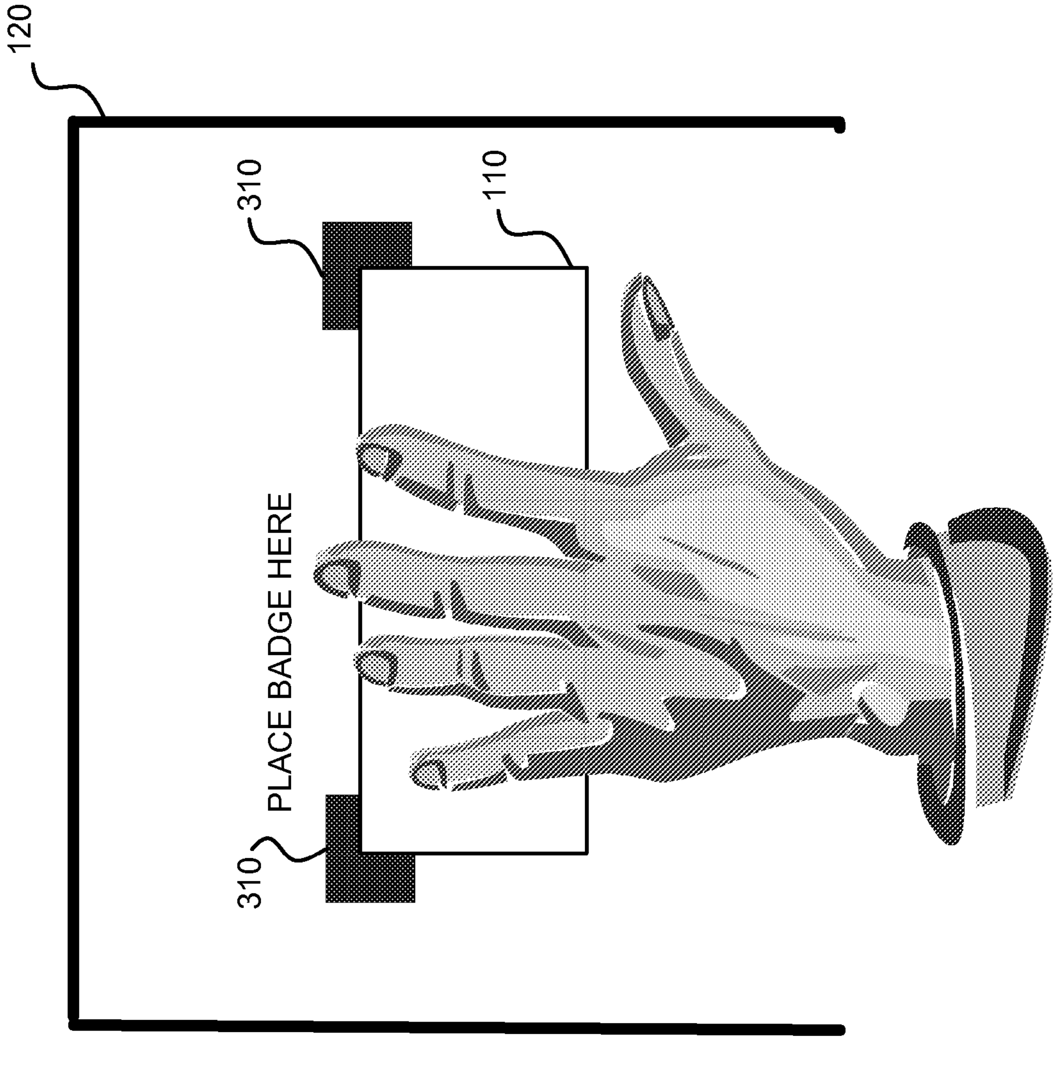
FIG. 3 is a diagram illustrating an exemplary security device interacting with an exemplary security device reader.

FIG. 3 illustrates security device 110 interacting with security device reader 120. For example, FIG. 3 shows a security device 110, a security device reader 120 and guides 310 located on security device reader 120. Guides 310 may be any type of structure used to restrict movement and/or properly orient security device 110 upon security device reader 120 for reading. As shown, a user may place security device 110 face-down upon security device reader 120 between guides 310. In one embodiment, guides 310 may be structures elevated from the surface of security device reader 120. In another embodiment, guides 310 may be depressions within the surface of security device reader 120. Optionally, security device reader 120 and security device 110 may use wireless communications. Optionally, security device 120 may have a display.

Figure 4:
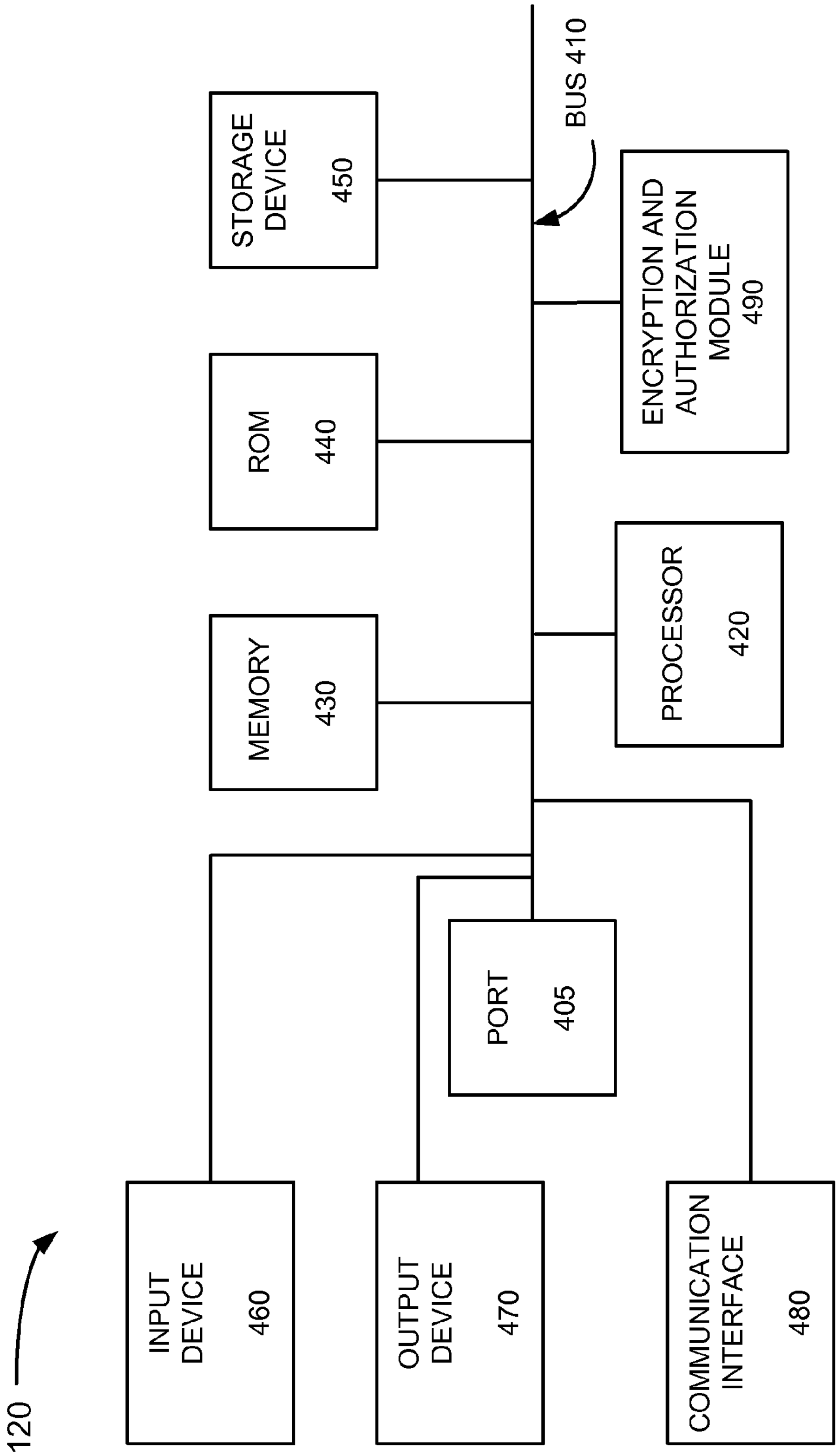
FIG. 4 is a block diagram illustrating exemplary components of a security device reader.

FIG. 4 is a diagram of an exemplary configuration of a security device reader 120. Security device reader 120 may include a port 405, a bus 410, a processor 420, a memory 430, a read only memory (ROM) 440, a storage device 450, an input device 460, an output device 470, a communication interface 480, and an encryption and authorization module 490. Security device reader 120 may be configured in a number of other ways and may include configurations to enable security device reader 120 to receive data from security device 110, encrypt and transmit data for storage on security device 110, and/or transmit to or receive data from another security device reader 120. In still further embodiments, security device reader 120 may be a portable device that may be transported to specific sites such as a disaster area, where security device reader 120 may be configured to read data from security device 110, but not be able to write data to security device 110.

Port 405 may include any type of connection port used to transmit data from and receive data at security device reader 120. Port 405 may be a Universal Serial Bus (USB) port or any other type of connection port. Port 405 may also be used to recharge a battery contained within security device 110. Bus 410 permits communication among the components of security device reader 120.

Processor 420 may include any type of processor or microprocessor that interprets and executes instructions. Processor 420 may also include logic that is able to receive signals and/or information and generate data to control a display, etc. Memory 430 may include a random access memory (RAM) or another dynamic storage device that stores information and instructions for execution by processor 420. Memory 430 may also be used to store temporary variables or other intermediate information during execution of instructions by processor 420.

ROM 440 may include a ROM device and/or another static storage device that stores static information and instructions for processor 420. Storage device 450 may include a magnetic disk or optical disk and its corresponding drive and/or some other type of magnetic or optical recording medium and its corresponding drive for storing information and instructions. Storage device 450 may also include a flash memory (e.g., an electrically erasable programmable read only memory (EEPROM)) device for storing information and instructions.

Input device 460 may include one or more mechanisms that may receive data at security device reader 120. For example, input device 460 may include a proximity chip capable of receiving data from a security device 110 via one or more radio frequency (RF) receivers when security device 110 is placed in proximity to security device reader 120, as shown in FIG. 3, for example. Input device 460 may also include biometric scanning mechanisms such as retinal scanners and fingerprint scanners. Output device 470 may include one or more mechanisms that may output information from security device reader 120. For example, output device 470 may include a proximity chip capable of transmitting information to a security device 110 via an RF transmitter, when a security device 110 is placed on or in close proximity to security device reader 120, for example. Output device 470 may also include mechanisms to control display portion 220 of security device 110, in order to output and/or display information.

Communication interface 480 may include any mechanism that enables security device reader 120 to receive data from, and transmit data to, other devices such as computer 130 and/or other systems. For example, communication interface 480 may receive from security device 110, such as log data, digital signature information and/or image information. Communication interface 480 may include a USB port, a modem or an Ethernet interface to a LAN. In addition, communication interface 480 may include other mechanisms for communicating via a network, such as a wireless network. For example, communication interface 480 may include one or more radio frequency (RF) transmitters and receivers and antennas for transmitting and receiving (RF) signals.

Encryption and authorization module 490 may include hardware and/or software that may store data, images, encryption applications and authorization information. For example, data stored in encryption and authorization module 490 may be received from computer 130. Data stored in encryption and authorization module 490 may also be transmitted to security device 110 for storage. Data stored in encryption and authorization module 490 may also be used to identify and validate a security device 110. For example, encryption and authorization module 490 may receive information from a security device 110, and may validate this received information.

According to an exemplary implementation, security device reader 120 may perform various processes in response to processor 420 executing sequences of instructions contained in memory 430 or ROM 440. Such instructions may be read into memory 430 from another computer-readable medium, such as storage device 450, or from a separate device via communication interface 480. A computer-readable medium may include one or more memory devices. Execution of the sequences of instructions contained in memory 430 or ROM 440 causes processor 420 to perform the acts that will be described hereafter. In alternative embodiments, hardwired circuitry may be used in place of or in combination with software instructions to implement aspects of the present embodiments. Thus, the embodiments are not limited to any specific combination of hardware circuitry and software.

Figure 5:
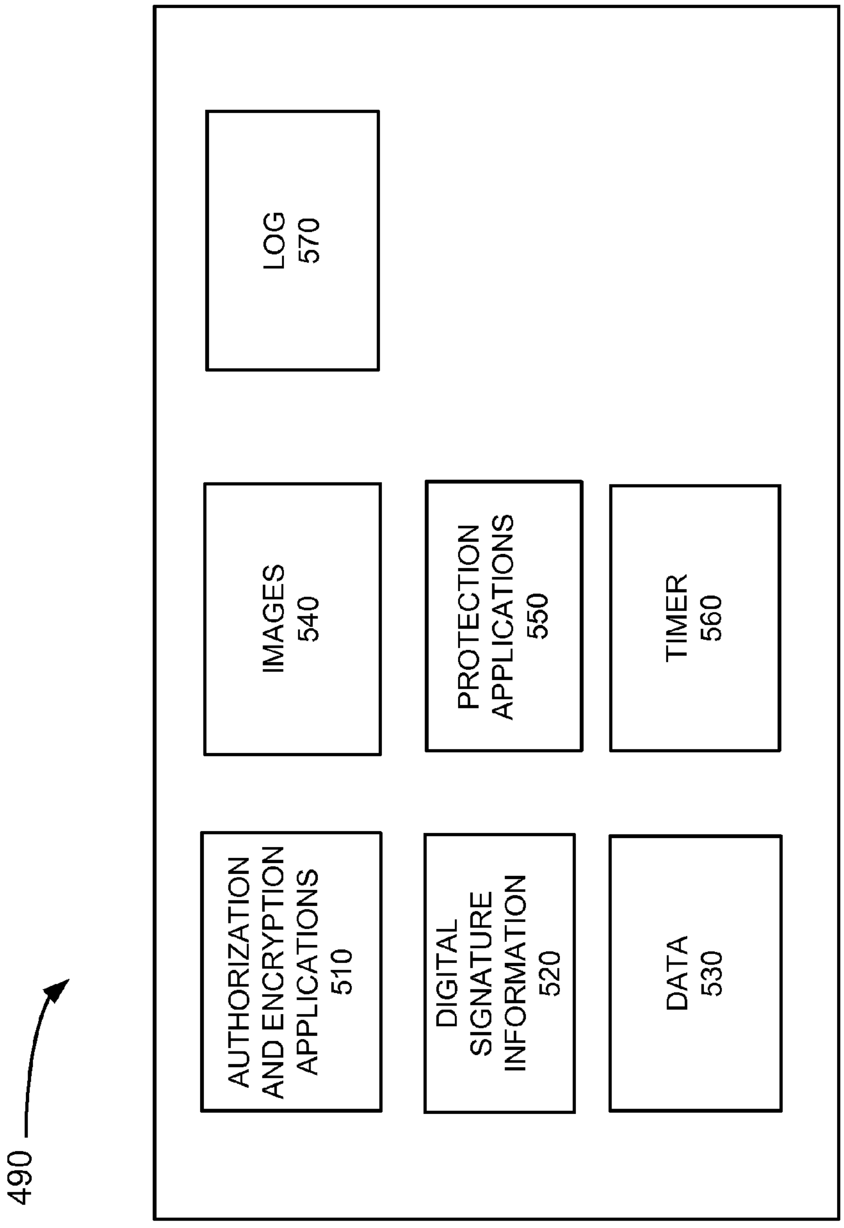
FIG. 5 illustrates exemplary components of an encryption and authorization module of a security device reader.

FIG. 5 is a block diagram illustrating exemplary components of encryption and authorization module 490. Encryption and authorization module 490 may include authorization and encryption applications 510, digital signature information 520, data 530, images 540, protection programs 550, timer 560 and a log 570.

Authorization and encryption applications 510 may encrypt/decrypt data that may be received from, or transmitted to, a security device 110 to determine the validity of security device 110. The encryption applications may also be used to encrypt data for storage in security device 110 or security device reader 120. Authorization and encryption applications 510 may also store, for example, a public encryption key, a private encryption key, and data relating to levels of authorization.

Digital signature information 520 may include information relating to the identification of security device reader 120 and information relating to a certified authority that may have validating information stored in security device reader 120. Digital signature information may also include digital signature information of a number of security devices 110. In other examples, a security device reader 120 may include hardware-specific information in digital signature information 520 to provide an audit trail in case revocation of trust becomes an issue.

Data structure 530 may include information relating to owners of security devices 110, such as name, title/rank, occupation, level of clearance, date of birth, code words, PINs, pass phrases, etc. Data structure 530 may also include information such as signing information from a certified authority that provided the data. For example, clearance data may be associated with an authority such as the Department of Homeland Security.

Images 540 may include digital images such as photographs, fingerprints and/or retinal scans of owners of security devices 110. Images 540 may also include valid and invalid display images and pictures/images relating to security events and may also include a sequence of animated images or a still image. Images 540 may also include certified full images of security devices 110. Also stored and associated with images 540 may be information relating to a certified authority that provided the image. For example, a digitally signed image of an owner of security device 110 may be associated with the image-providing authority such as the state of Virginia.

Protection applications 550 may include programs that may protect data contained in encryption and authorization module 490. For example, protection applications 550 may destroy or erase a private key stored in authorization and encryption applications 510 if tampering is detected. Protection applications 550 may also destroy or erase data 530 and images 540 stored in encryption and authorization module 490 if tampering is detected, in order to ensure that widespread revocation of trust is not required. Protection applications 550 may also destroy or erase data in security device 110 if an invalid security device 110 is identified by security device reader 120.

Timer 560 may include any type of timing mechanism that may track time. For example, a crystal oscillator or any other type of time keeping mechanism. Timer 560 may also be used to produce a time stamp when interacting with a security device 110.

Log 570 may store data that relates to days/times and identifying information of security devices (such as security device 110) that have been read by security device reader 120. For example, log 570 may include information such as "03-16-07/2:57 PM," associated with "2413768." In this example, on Mar. 16, 2007 at 2:57 PM, a security device 110, with identifying information "2413768," may have been read by security device reader 120. In other embodiments, log 570 may store information relating to identification numbers of security devices and days/times of writing encrypted data into security devices 110. In still further embodiments, log 570 may store information received from logs within security devices 110, such as a dumped security device audit log. Contents of log 570 may also be transmitted via communication interface 480 (in a wired or wireless manner) to another device, such as a central management and/or administrative system. A central management and/or administrative system may receive log information from a number of security device readers 120 and the received contents of log 570 may then be examined for auditing purposes, analysis of security system 100 behaviors, etc. Contents of log 570 may also be transmitted via communication interface 480 to another device, such as computer 130 for display.

FIG. 6 illustrates details of a data structure 530 according to an exemplary embodiment. As shown, data structure 530 may include multiple entries, each of which includes an item of data 610 and other associated data including a trust level 620, an authority 630, a signature 640, restrictions 650 and a display flag 660.

Data 610 may include information relating to an entity associated with security device 110 or security device reader 120. For example, data 610 may include one or more of an entity's name, title, level of trust, home address, social security number, etc. Data 610 may also include information relating to security events, procedures, etc. Data 610 may also include images (540 as described above with reference to FIG. 5) relating to the identity of security device owner, such as the owner's image, fingerprints, sequence of animated images, etc.

Trust level 620 may include information identifying a level of trust that may be necessary to read and/or access corresponding data 610. For example, data 610 may be classified by four levels of trust indicated by T1, T2, T3 and T4 where trust level T1 is the most secure and highest level of trust. As further described below with reference to FIG. 8 below, data 610 may be accessed after comparing the trust level 620 of data 610 to the level of trust of another device. For example, a trust level 2 "T2" device may access any data 610 stored in security device 110 that may be associated with trust levels 2-4, but may not access trust level 1 "T1" data 610 in security device 110.

Authority 630 may include information identifying the authority that may have provided and/or that may be associated with data 610. For example, authority "A1" may represent the Federal Bureau of Investigation (FBI) and authority "A7" may represent the Fairfax County Police Department.

Signature 640 may include a digital signature associated with the authority 630 that provided the associated data 610. For example, for data 610 item D3, "S11" may represent the digital signature of the corresponding signing authority "A7," the Fairfax County Police Department. In other examples, a single entry of data 610 may be "signed" (include the digital signature of) by a number of authorities, in which case there may be a number of authorities 630 and a corresponding number of signatures 640 associated with the single entry of data 610. For example, data "D4" may have been signed by authorities "A2" and "A3," therefore signatures "S3" and "S4" may be associated with data "D4."

Restriction 650 may include information relating to restrictions that may be associated with data 610. For example, restriction "R1" may indicate that associated data "D3" may be accessed and read, however it may not be changed. In other examples, as described above, if a single entry of data 610 (D4) is associated with a number of authorities 630, there may also be corresponding restrictions 650 (R2 and R3), where a restriction 650 is based on the corresponding authority 630 (A2 and A3).

Display flag 660 may include information relating to whether the associated data 610 may be displayed. For example, data "D2" may be accessed but not displayed. For example, display flag 660 may include a bit (one or zero) where a zero indicates that data 610 may be displayed and a one indicates that data 610 is not for display.

Figure 7:
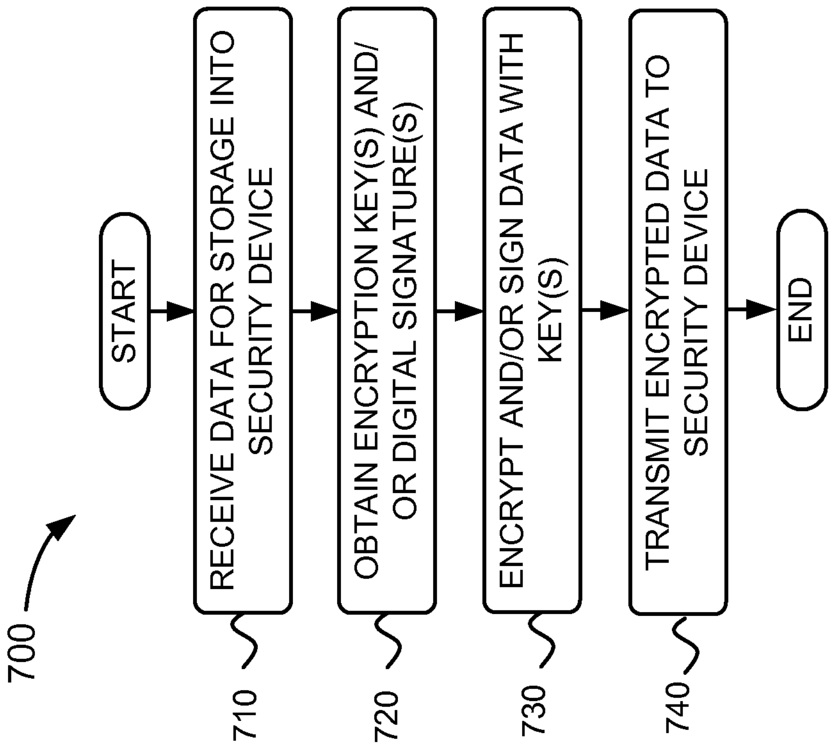
FIG. 7 is a flow diagram illustrating an exemplary process of storing data at a security device reader.

FIG. 7 illustrates an exemplary process 700 of receiving data at security device reader 120 that may subsequently be written to security device 110. Process 700 may begin by receiving data to be stored in a security device (block 710). For example, a trusted authority may collect data (text and/or images) relating to an individual and enter this data into security device reader 120 via computer 130, for example. The received text data may include name, title/rank, level of clearance, level of authorization, etc. The received image data may include an image of the owner of the security device 110, fingerprint images, a full image of the security device 110, and other data related to the owner's level of trust, authority or clearance, for example. The received text and image data may be received through communication interface 480, and stored in encryption and authorization module 490 or storage device 450 as data 610-660 in an entry of data structure 530 (or image 540).

Referring to FIG. 6, for example, data 610 that may be received by security device reader 120 may also include entries 620-660. For example, an operator working for the Department of Homeland Security may use computer 130 to enter or provide data "D1" that has an associated level of trust "T1." In this example, the data "D1" may also be associated with information "A1" identifying the authority (Department of Homeland Security) that has certified the content of the data "D1" and may also include digital signature information "S1" from the Department of Homeland Security, and information relating to any further restrictions to access or display the data "D1." In other examples, images 540 may also be received and stored. For example, an operator working for the state of Virginia may use computer 130 to provide an image 540 used for a drivers' license which may also contain associated entries 620-660 (as shown in FIG. 6) that define a level of trust, the authority, the digital signature of the authority and restrictions as determined by the state of Virginia. In still further examples, data received by security device reader 120 may also include a unique identification number associated with a security device 110.

Process 700 may continue when security device reader 120 obtains encryption key(s) and/or digital signature(s) (block 720). For example, security device reader 120 may obtain a necessary encryption key. For example, security device reader 120 may retrieve a public encryption key and a related private encryption key as stored in encryption and authorization module 490. In another example, security device reader 120 may obtain digital signature information 520, as stored in encryption and authorization module 490. In other examples, security device reader 120 may generate a public encryption key and related private encryption key and/or may generate digital signature information. In further examples, encryption keys and/or digital signature information may be previously stored in, and provided by security device 110. In other embodiments, symmetric encryption keys and/or digital signature information may be generated with techniques other than PKI techniques.

After receiving data and obtaining encryption keys and/or digital signature information as described above in blocks 710-720, security device reader 120 may encrypt and/or digitally sign the received data using the encryption keys and/or digital signature information (block 730). For example, security device reader 120 may encrypt the received data using a public encryption key. As described above with respect to FIG. 6, the encrypted data and images may also include a trust level 620, authority 630, signature 640, restrictions 650 and display flag 660. In addition to encrypting the received data, security device reader 120 may associate a unique identification number with the data, where the unique identification number ensures that the data may only be successfully used by a specific security device 110. In this manner, a stolen digital signature is prevented from being used by another security device. Additionally, digital signatures and/or certifying authority data of security device reader 120 may also be contained within the encrypted data so that upon reception, security device 110 may confirm that the received data is from a valid source. In still further embodiments, data and/or images may be digitally signed by security device reader 120 without being encrypted in block 730, for example. In other embodiments data and/or images may be encrypted by security device reader 120 using multiple encryption keys and/or multiple digital signatures that may allow the data and/or images to be associated with a number of levels of trust, for example.

Once the received data has been encrypted and/or digitally signed by security device reader 120, the encrypted data may be written to security device 110 (block 740). For example, security device reader 120 may connect to security device 110 via communication interface 480 or port 405. In other examples, security device 110 may be placed on security device reader 120 as shown in FIG. 3, and may receive the encrypted data transmitted from security device reader 120 via a proximity chip contained in output device 470, for example. Once received by security device 110, the encrypted data may be stored in security device 110. For further details regarding the reception and storage of data in security device 110, see U.S. Pat. No. 7,733,231, titled "Security Device With Display", the complete contents of which are herein incorporated by reference. After receiving and storing encrypted data, security device reader 120 may interact with security device 110 as described below with reference to FIG. 8.

Figure 8:
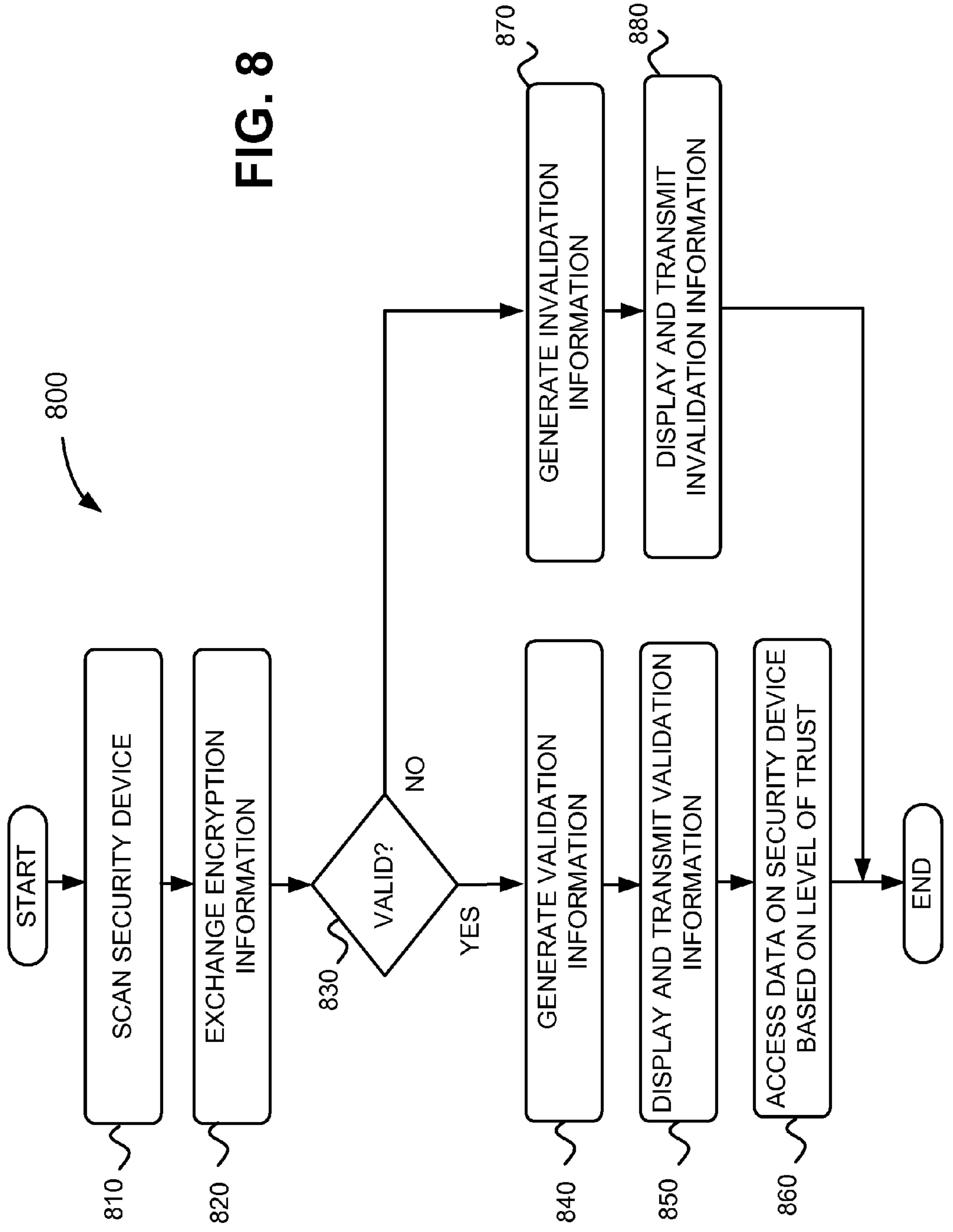
FIG. 8 is a flow diagram illustrating an exemplary process of security device reader interacting with a security device.

FIG. 8 is a flow diagram illustrating an exemplary process 800 for reading data from security device 110 using security device reader 120. Process 800 may begin by scanning security device 110 (optional block 810). For example, security device 110 may be placed onto security device reader 120 as shown in FIG. 3. While face-down on security device reader 120, a scanned image of the surface of security device 110 may be obtained by a scanner within security device reader 120. The scanned image of security device 110 may then be compared to stored, digitally signed images available to security device reader 120 or provided by security device 110 as described below. In other embodiments for example, security device reader 120 may be configured as a portable device and may not contain a scanner and may not perform block 810. In other embodiments, security device reader 120 may be configured to optionally perform scanning of security device 110. In further embodiments, digitally signed images may be available from external sources such as computer 130.

After scanning security device 110, security device reader 120 may exchange encryption information with security device 110 (block 820). As used herein, the term encryption information may include encrypted data and/or images (that have been encrypted using any technique), digitally signed data and/or images (which may or may not be encrypted), encryption keys, device identifier values and/or additional information relating to encryption or validation processes. For example, while security device 110 is positioned on security device reader 120 as shown in FIG. 3, security device reader 120 may exchange encryption information with security device 110, using input device 460 and output device 470 or port 405. For example, the security device reader may exchange encryption information with security device 110 using digital signing techniques and/or public key infrastructure (PKI) techniques. For example, security device reader 120 may use a private key to decrypt and public key(s) to validate digital signature information received from security device 110, in order to confirm that security device 110 is valid.

In one example, when a security device reader 120 exchanges encryption information with security device 110 using PKI techniques, security device 110 may transmit its public key to security device reader 120. The security device reader 120 may then use this received public key to encrypt a code or number, which is then transmitted back to security device 110. Security device 110 may then decrypt this received encryption information from security device reader 120 using its stored private key. The decrypted code may then be encrypted by security device 110 using a public key received from security device reader 120 and then may be transmitted back to security device reader 120. If the original code is successfully decrypted by security device reader 120, the exchange of encryption information is successful. This exemplary process of exchanging encryption information may be employed in order to defeat man-in-the-middle attacks.

Additionally, more encrypted data transmissions and verifications may be included in the above examples of exchanging encryption information. For example, digital signatures of security device reader 120 and security device 110 may also be included in transmissions of public keys between interacting security devices and the digital signatures may be verified by each device upon reception, in order to ensure mutual authentication. In still further examples, encryption information transmitted between security device reader 120 and security device 110 may be digitally signed by each device and may not be encrypted, for example.

In other examples, fewer data transmissions and verifications may be performed when security device reader 120 exchanges encryption information with security device 110 using PKI techniques. For example, security device 110 may use its public key to encrypt a code or number and transmit the encrypted code or number to security device reader 120. Upon receiving the encrypted code or number, security device reader 120 may decrypt the code or number using a stored private key and determine that security device 110 is valid if the decrypted code is recognized, for example.

As described above, the exchange of encryption information may also be performed employing other types of encryption techniques and may also be based on the level of clearance and/or number of certifying authorities, etc. In other examples, security device reader 120 may request and verify an identification value of a security device 110 before proceeding with an exchange of encryption information. In further examples, the exchange of encryption information may include storing the identifying information relating to the security device 110 that has interacted with security device reader 120. For example, the day/time of interaction with a security device 110 and the interacting security device ID may be stored in log 570 of security device reader 120.

Processing may continue by determining if the exchange of encryption information was valid (block 830). For example, security device reader 120 may access encryption and authorization module 490 to determine if the decrypted exchanged information may positively determine and identify a valid security device 110 (YES—block 830). If the exchange of encryption information does not succeed, the encryption exchange may be determined to be invalid (NO—block 830). For example, if an identification number or digital signature of either device is not recognized by the other, the exchange of encryption information may be determined to be invalid. In another example, if the scanned image of security device 110 does not match a stored image within security device reader 120, the security device 110 may be determined to be invalid. For example, if a scanned image of a logo, pattern, hologram or border on the surface of printed portion 210 of security device 110 does not match an image stored in security device reader 120, the security device 110 may be determined to be invalid. In still further embodiments, if input device 460 of security device 120 has biometric input capabilities (such as retinal scans, fingerprints etc), real-time biometric scans may be compared to stored biometric images received from security device 110 to further determine validity of a user.

If the exchange of encryption information is valid, security device reader 120 may generate validation information (block 840). For example, security device reader 120 may access previously stored data and images in authorization and encryption module 490 to generate validation information. For example, data such as "VALID" and a time stamp indicating the time of validation (produced by timer 560) may be generated. In other examples, stored images may also be generated in response to a valid encryption exchange. For example, a logo, a still image or an animated sequence of images may be accessed from authorization and encryption module 490.

Figure 9:
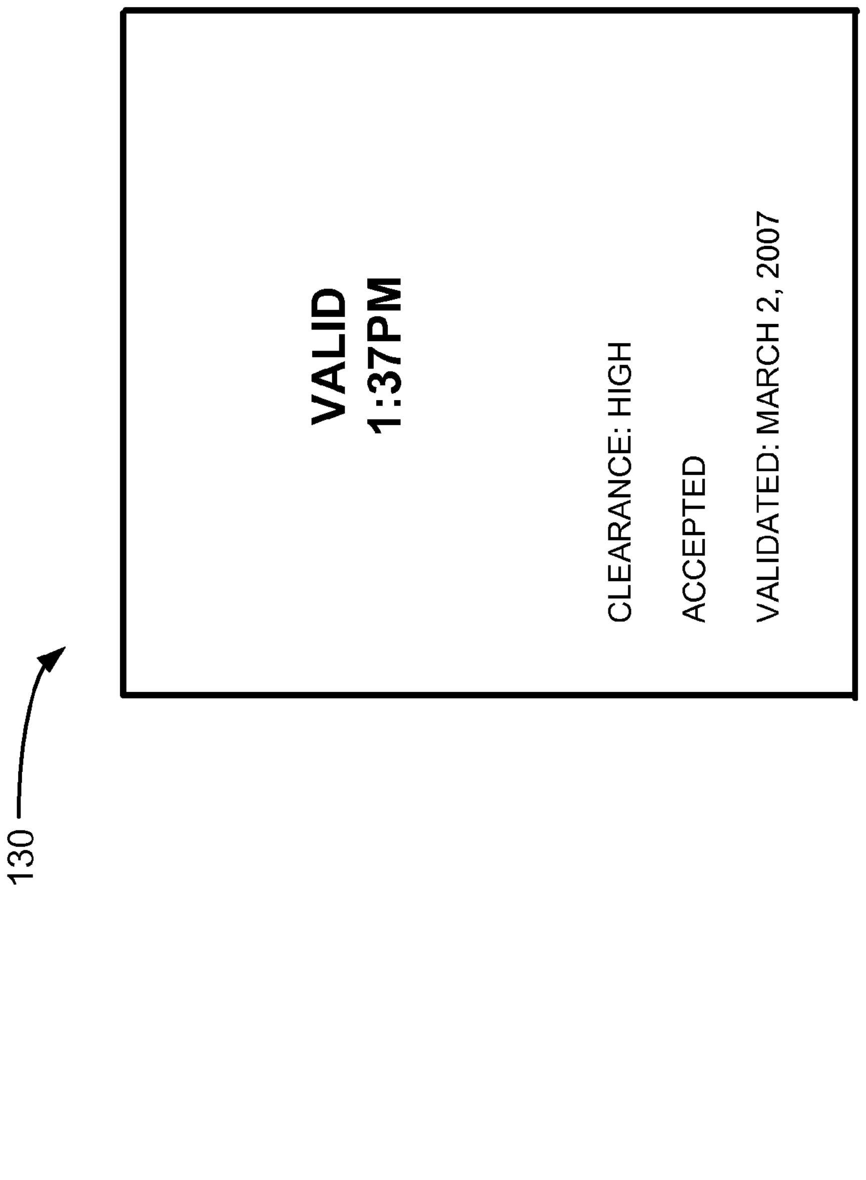
FIG. 9 illustrates an example of displaying validation information using the method described in FIG. 8.

The generated validation information may be displayed and transmitted (block 850). For example, the generated validation information may be transmitted to computer 130 for display and may also be transmitted to security device 110 for display. FIG. 9 shows a display of validation information on computer 130. In this example, the generated validation information "VALID" and "1:37 PM" may be displayed on the monitor of computer 130. Additional information displayed on computer 130 may include data received from security device 110 during the encryption exchange such as "Clearance: High" "Accepted" and "Validated: Mar. 2, 2007" or biometric data and/or images. In this manner, a security guard or other authorized personnel viewing computer 130, may quickly identify and verify authorized users of security devices 110.

Figure 10:
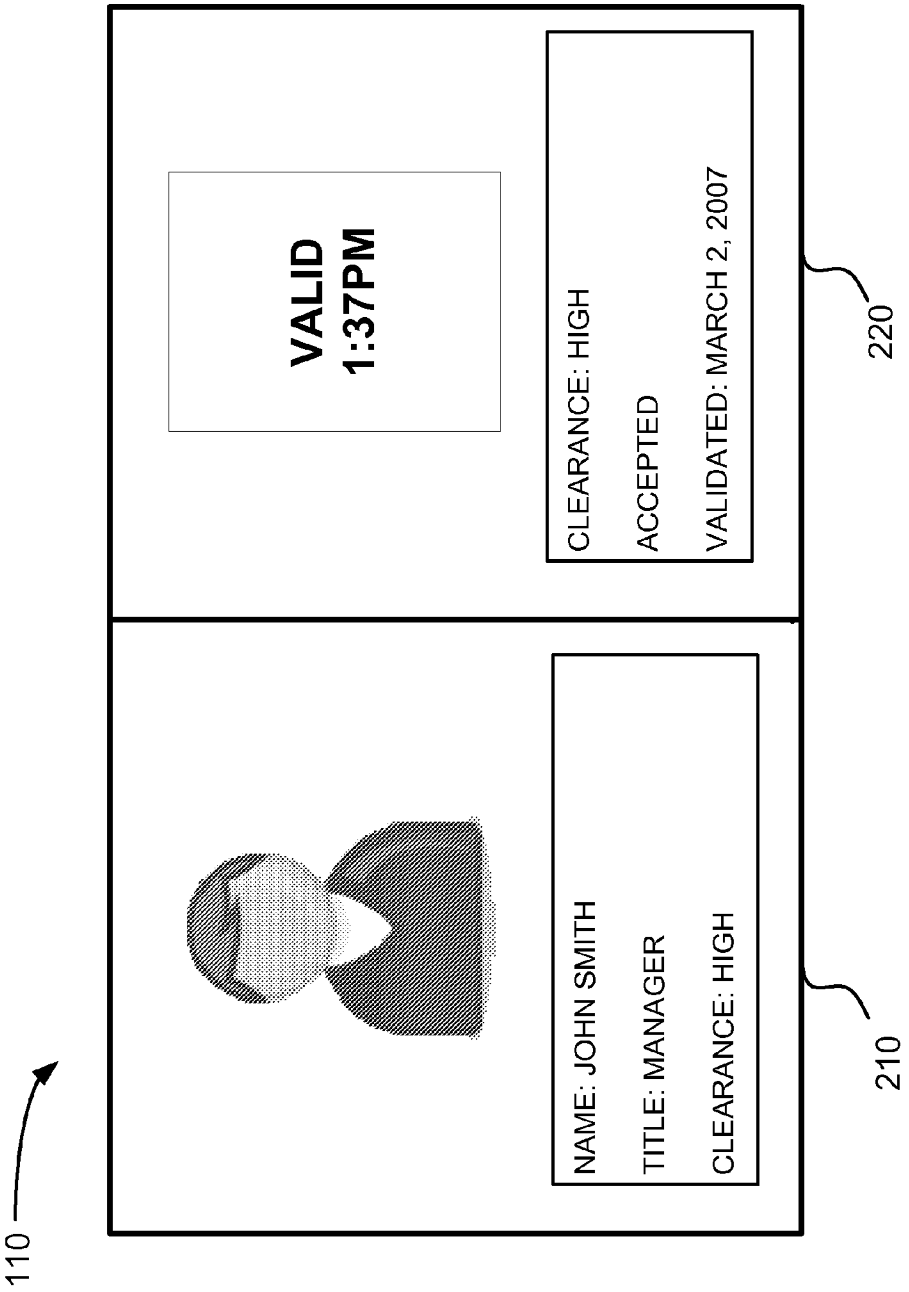
FIG. 10 illustrates an example of displaying validation information on a security device using the method described in FIG. 8.

After generating validation information as shown in FIG. 9, the validation information may be transmitted to security device 110 to indicate that the security device 110 is valid. After successfully performing blocks 810-840, the generated validation information "VALID" and "1:37 PM" may be displayed on display portion 220 of security device 110. Additional validation information "Clearance: High" "Accepted" and "Validated: Mar. 2, 2007" may also be displayed via display portion 220. For example, FIG. 10 shows display portion 220 of a security device 110 that displays the received validation information from security device reader 120. As described above with reference to FIG. 2, security device 110 may be owned by "John Smith," and may include John Smith's image and information on printed portion 210 of security device 110.

If the encryption exchange is valid, security device reader 120 may be allowed to access data stored on security device 110 based on the authority 630 and trust level 620 associated with security device reader 120 (block 860). For example, security device reader 120 may be associated with authority 630 and trust level 620 and may then access data stored on security device 110 based on these criteria. Referring to FIG. 6, data stored in security device 110 may be associated with a level of trust as shown in column 620. If for example, trust level 1 is the highest level of trust, and security device reader 120 is a trust level 2 device, data (stored on security device 110) associated with levels 2-4 may be accessed by security device reader 120. If security device reader 120 is a trust level 1 device, security device reader 120 may access all data stored in security device 110. Security device reader 120 may also access and display data received from security device 110. For example, digital signature information and/or contents of a log contained with security device 110 may be transmitted to computer 130 for display. A full image of security device 110 may also be transmitted to security device reader 120 for display via computer 130.

In addition to accessing data, security device reader 120 may also modify and/or store additional data within security device 110. For example, timer 560 may provide time stamp information to be stored in security device 110 indicating days/times of interactions with security device reader 120. Protection applications 550 may also modify or update data stored within security device 110 if security device reader 120 has a sufficient level of trust.

Figure 11:
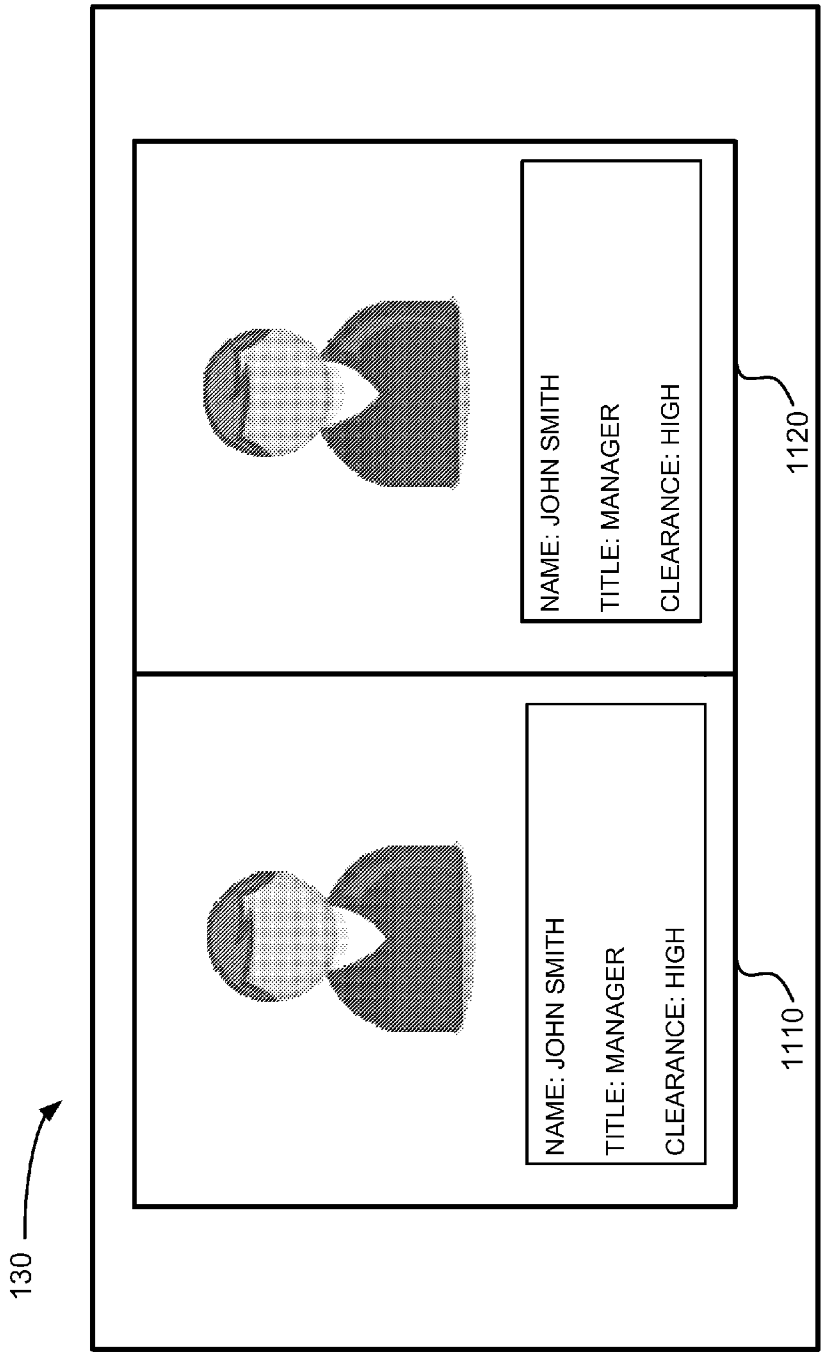
FIG. 11 illustrates another example of displaying validation information using the method described in FIG. 8.

FIG. 11 shows another example of generating and displaying validation information. As described above, security device 110 may be owned by "John Smith," and may include John Smith's image and information on printed portion 210 of security device 110. In this example, a scanned image 1110 of security device 110 may be displayed (via computer 130) adjacent to a received image 1120 from security device 110. For example, a scanner contained in input device 460 of security device reader 120 may scan printed portion 210 of security device 110 to produce image 1110. Image 1120 may be transmitted from security device 110 and received by security device reader 120. In this example, displaying a received digital image 1120 of a user of security device 110 adjacent to a scanned image 1110 of security device 110, may allow a guard or any other authorized personnel to quickly verify that the user of security device 110 matches the image on printed portion 210 and matches a stored image of a user of security device 110.

If an exchange of encrypted information is determined to be invalid, a security device reader 120 may generate invalidation information (block 870). For example, if security device reader 120 exchanges encrypted information with security device 110 and security device 110 contains an invalid identification or digital signature, security device reader 120 may generate invalidation information. For example, security device reader 120 may access previously stored data and images in authorization and encryption module 490 to generate invalidation information, such as "ACCESS DENIED" and "NOT VALID." In other examples, stored images or other messages may be generated in response to an invalid encryption exchange, such as "Card Can Not Be Read." Additionally, stored data and encryption applications on security device 110 may be destroyed using protection applications 550 in response to an invalid encryption exchange.

Figure 12:
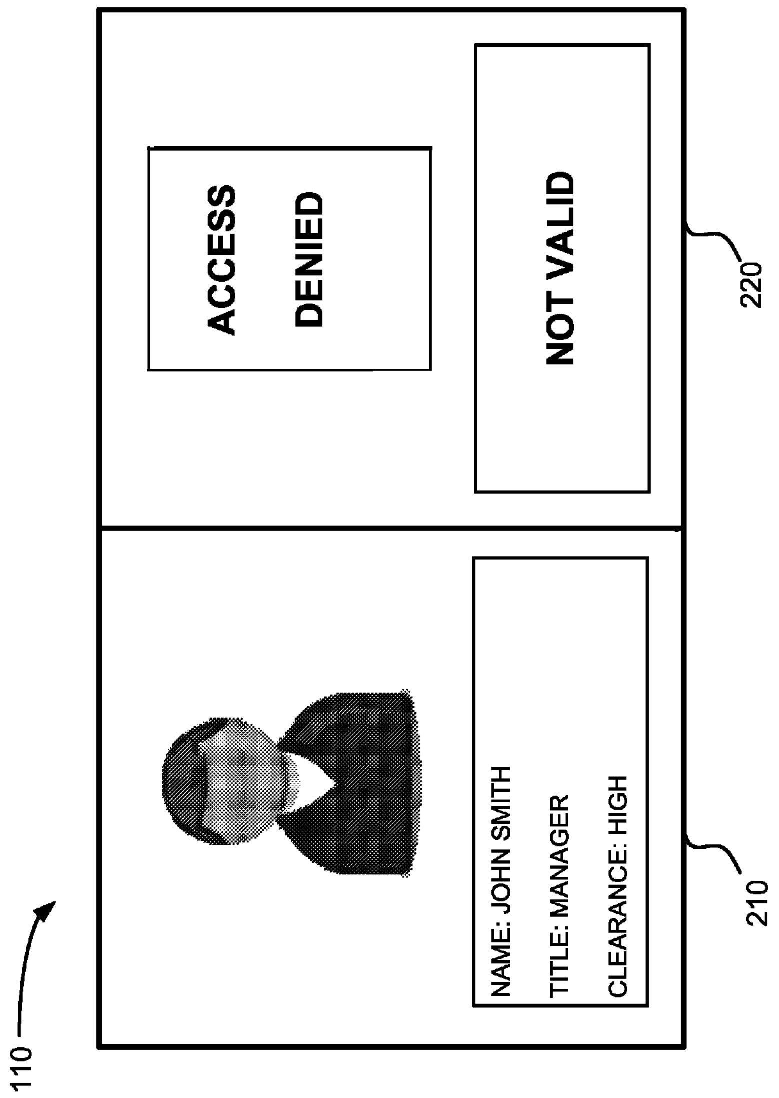
FIG. 12 illustrates another example of displaying validation information on a security device using the method described in FIG. 8.

If an exchange is determined to be invalid, the generated invalidation information may be displayed and transmitted (block 880). For example, the generated invalidation information may be transmitted to computer 130 for display and may be transmitted to security device 110 for display. For example, display surface 220 of security device 110 may be controlled to indicate an invalid security device 110. For example, FIG. 12 shows an exemplary security device 110 that has been determined to be invalid. If security device reader 120 determined an invalid identification or digital signature within security device 110, display portion 220 of security device 110 may be changed to display the generated invalidation information "ACCESS DENIED" and "NOT VALID." The generated invalidation information may also be displayed (without displaying a scanned image of security device 110) via computer 130, as shown in FIG. 9, for example.

Figure 13:
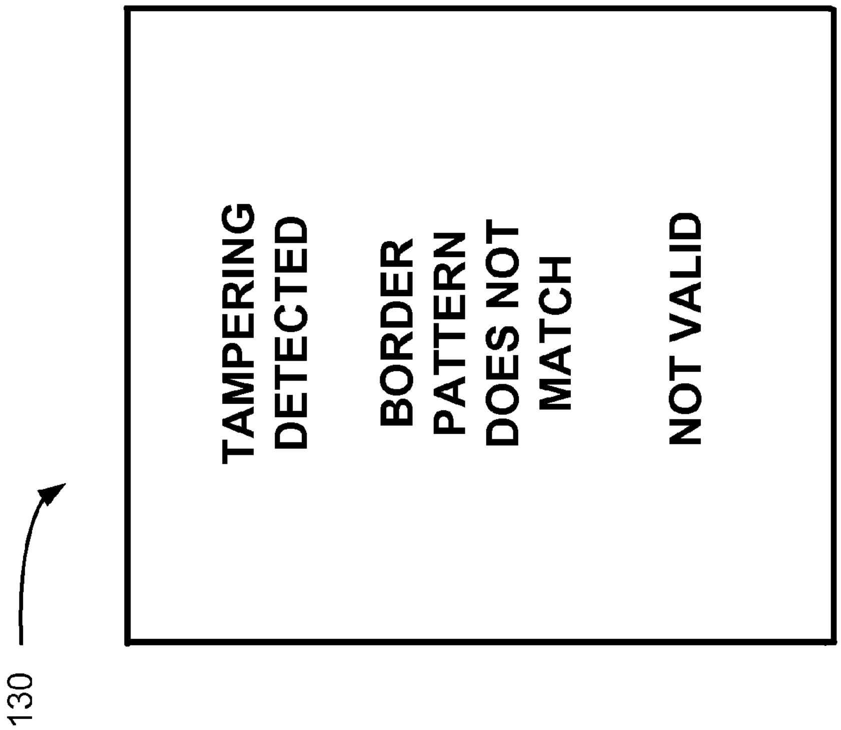
FIG. 13 illustrates another example of displaying validation information using the method described in FIG. 8.

FIG. 13 shows another example of displaying generated invalidation information. In this example the generated invalidation information may be displayed via computer 130. For example, if the border pattern of security device 110 has been tampered with, a scanned image of security device 110 will not match a stored image of security device 110, and invalidation information such as "Tampering Detected Border Pattern Does Not Match Not Valid," may be displayed via computer 130. Additionally, this generated invalidation information may be transmitted to, and displayed on display portion 220 of security device 110. In this manner altered security devices may be detected and rendered ineffective by security device reader 120.

The foregoing description provides illustration and description, but is not intended to be exhaustive or to limit the embodiments to the precise form disclosed. Modifications and variations are possible in light of the above teachings or may be acquired from practice of the embodiments.

Further, while series of blocks have been described with respect to FIGS. 7 and 8, the order of the blocks may be varied in other implementations consistent with the embodiments. Moreover, non-dependent acts may be performed in parallel.

It will also be apparent that exemplary embodiments as described above, may be implemented in other devices/systems, methods, and/or computer program products. Accordingly, the present embodiments may be embodied in hardware and/or in software (including firmware, resident software, micro-code, etc.). Furthermore, the present embodiments may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the embodiments is not limiting of the embodiments. Thus, the operation and behavior of the aspects were described without reference to the specific software code—it being understood that one would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

No element, act, or instruction used in the description of the present application should be construed as critical or essential to the embodiments unless explicitly described as such. Also, as used herein, the articles "a" and "an" are intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:

exchanging, by a computer device, digitally signed information with a security card;

determining, by the computer device, whether the security card comprises a valid security card based on exchanging the digitally signed information;

generating, by the computer device, validation information based on determining whether the security card comprises the valid security card, where the validation information indicates that the security card comprises the valid security card or that the security card comprises an invalid security card;

transmitting, by the computer device, the validation information to the security card for display;

storing, by the computer device, first information associated with exchanging the digitally signed information in a memory of the security card when the security card comprises the valid security card; and removing, by the computer device, second information associated with exchanging the digitally signed information from the memory of the security card when the security card comprises the invalid security card.

2. The method of claim 1, further comprising:

scanning an image of the security card; and comparing the scanned image of the security card to a stored image of the security card, where the computer device determines whether the security card comprises the valid security card further based on comparing the scanned image of the security card to the stored image of the security card.

3. The method of claim 2, further comprising:

displaying the scanned image of the security card and the validation information on a monitor.

4. The method of claim 1, further comprising:

receiving an image of a user of the security card;

comparing the received image of the user to a stored image of the user, where the computer device determines whether the security card comprises the valid security card further based on comparing the received image of the user to the stored image of the user; and displaying the received image of the user of the security card on a monitor.

5. The method of claim 1, where the validation information comprises one of text or images that are displayed via the security card, the one of the text or the images indicating that the security card is valid or text or images indicating that the security card is invalid.

6. A device comprising:

a memory to store encryption information;

an interface to exchange the encryption information with a security card; and a processor to:

determine whether the security card comprises a valid security card based on exchanging the digitally signed information, generate validation information based on determining whether the security card comprises the valid security card, the validation information indicating that the security card comprises the valid security card or that the security card comprises an invalid security card, transmit the generated validation information to the security card for display, store first information associated with exchanging the encryption information in a memory of the security card when the security card comprises the valid security card, and remove second information associated with exchanging the encryption information from the memory of the security card when the security card comprises the invalid security card.

7. The device of claim 6, further comprising:

a scanner to produce a scanned image of a surface of the security card.

8. The device of claim 7, further comprising:

a display, and where the processor is further to:

control the display to display the generated validation information and the scanned image of the security card.

9. The device of claim 6, further comprising:

a display, where the interface is further to:

receive an image of a user of the security card through the interface, and where the processor is further to:

control the display to display the generated validation information and the image of the user of the security card.

10. The device of claim 7, where the processor is further to:

generate the validation information based on one of digital content received from the security card or the scanned image of a surface of the security card.

11. A method, comprising:

receiving, by a computer device, information relating to a user;

obtaining, by the computer device, a digital signature and an encryption key;

digitally signing and encrypting, by the computer device, the received information relating to the user using the digital signature and the encryption key, the digitally signed and encrypted information including an identifier associated with a first security card;

transmitting, by the computer device, the digitally signed and encrypted information and the encryption key to the first security card for storage;

exchanging, by the computer device, digitally signed and encrypted information with a second security card;

determining, by the computer device, that the digitally signed and encrypted information exchanged with the second security card includes the identifier associated with the first security card; and determining, by the computer device, that the second security card is invalid based on the digitally signed and encrypted information exchanged with the second security card including the identifier associated with the first security card.

12. The method of claim 11, where the received information relating to the user further comprises:

a digital image of the user, a name of the user, and a clearance of the user.

13. The method of claim 12, where digitally signing and encrypting the received information relating to the user further comprises:

encrypting the identifier with the received information relating to the user.

14. The method of claim 11, further comprising:

associating a level of trust, an authority, and restriction information with the received information of the user.

15. The method of claim 11, where the encryption key is a symmetric encryption key.

16. A device comprising:

a memory to store a digital signature and an encryption key;

a processor to:

receive information relating to a user of a first security card, digitally sign and encrypt the received information using the stored digital signature and encryption key, the digitally signed and encrypted information including an identifier associated with a first security card; and an interface to transmit the digitally signed and encrypted information and the encryption key to the first security card for storage; and where the processor is further to:

exchange second digitally signed and encrypted information with a second security card, determine that the second digitally signed and encrypted information includes the identifier associated with the first security card, and determine that the second security card is invalid based on the second digitally signed and encrypted information including the identifier associated with the first security card.

17. The device of claim 16, where the digital signature is associated with a certifying authority.

18. The device of claim 17, where the received information relating to the user of the first security card further comprises:

a digital image, a name, and a level of trust.

19. The device of claim 18, where the processor is further to:

associate the identifier with the received information relating to the user of the first security card.

20. The device of claim 16, where the digitally signed and encrypted received information includes a plurality of digital signatures.

* * * * *